United States Patent [19]

DeLuca et al.

[11] Patent Number: 5,089,813
[45] Date of Patent: Feb. 18, 1992

[54] METHOD OF SUPER BATTERY SAVING IN A SELECTIVE CALL RECEIVER

[75] Inventors: Michael J. DeLuca, Boca Raton; Leon Jasinski, Ft. Lauderdale; David F. Willard, Plantation, all of Fla.

[73] Assignee: Motorola, Inc., Schaumburg, Ill.

[21] Appl. No.: 382,165

[22] Filed: Jul. 19, 1989

[51] Int. Cl.$^5$ ............................................. H04B 7/00
[52] U.S. Cl. ........................... 340/825.44; 340/825.52; 455/343
[58] Field of Search ........... 340/311.1, 825.44, 825.47, 340/825.48, 825.52; 455/31, 343

[56] References Cited

U.S. PATENT DOCUMENTS

| | | | |
|---|---|---|---|
| 4,369,443 | 1/1983 | Giallanza et al. | 340/825.47 |
| 4,427,980 | 1/1984 | Fennell et al. | 340/825.52 |
| 4,668,949 | 5/1987 | Akahori | 340/825.47 |
| 4,688,035 | 8/1987 | Gray et al. | 340/825.52 |
| 4,783,654 | 11/1988 | Ichikawa | 340/311.1 |
| 4,823,123 | 4/1989 | Siwiak | 340/825.44 |
| 4,860,003 | 8/1989 | DeLuca et al. | 340/825.44 |

OTHER PUBLICATIONS

"Semi-Distributed Addressing, a New concept for ERMES Radio Protocol" May 11, 1989.
"Subaddressing, a Battery Saving Method" Mar. 16, 1989.

*Primary Examiner*—Donald J. Yusko
*Assistant Examiner*—Dervis Magistre
*Attorney, Agent, or Firm*—Daniel R. Collopy; Vincent B. Ingrassia; William E. Koch

[57] ABSTRACT

A paging receiver receives a message signal having an address field and a data field. The message has at least one address within the address field and a plurality of packets in the data field. The data packets contain a predetermined amount of information. A method for conserving power during reception of a message signal having an address field comprising a number of addresses involves entering the power conserving mode of operation after attempting to correlate a predetermined number of addresses with the paging receiver's address, where the predetermined number is less than the number of addresses in the address field. In addition, message information may be included within a plurality of packets by several methods including placing a corresponding plurality of addresses in the address field, each address indicating the occurrence of message information, or by indicating in one packet that information follows in a subsequent packet. Use of the second method provides for placing of tone only messages in positions left vacant in the address field by the subsequent data packets. Additionally, the invention provides for varying the size of the address field with a boundary signal.

12 Claims, 3 Drawing Sheets

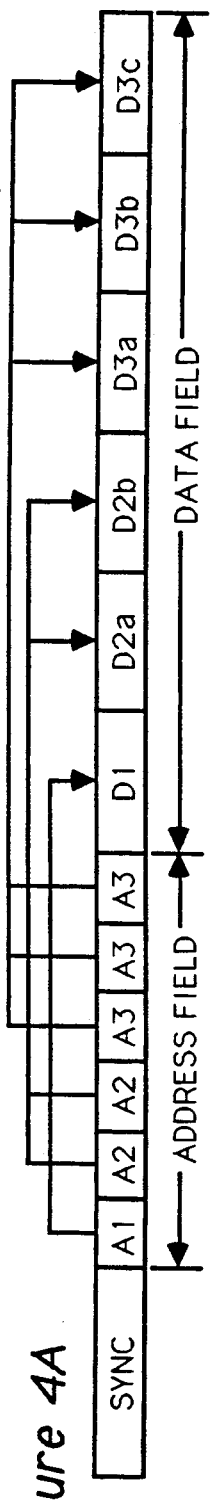
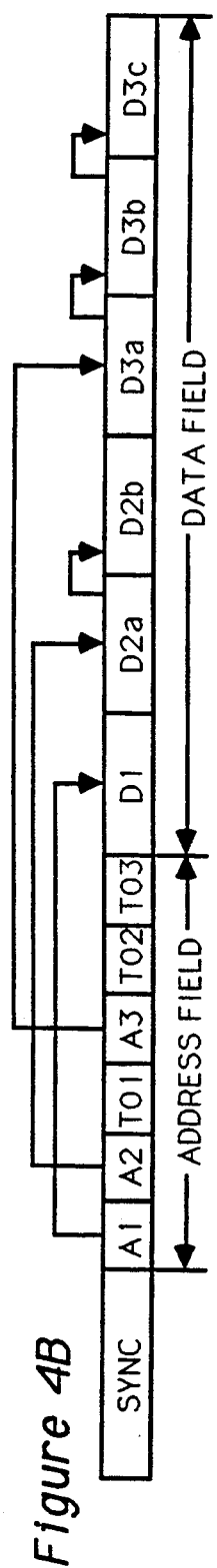
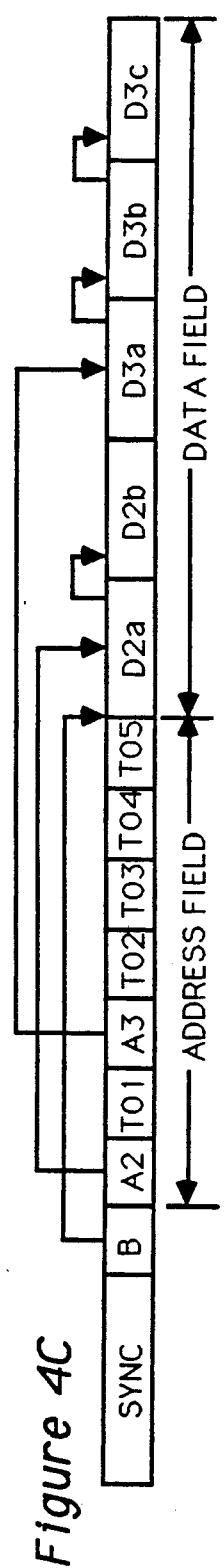
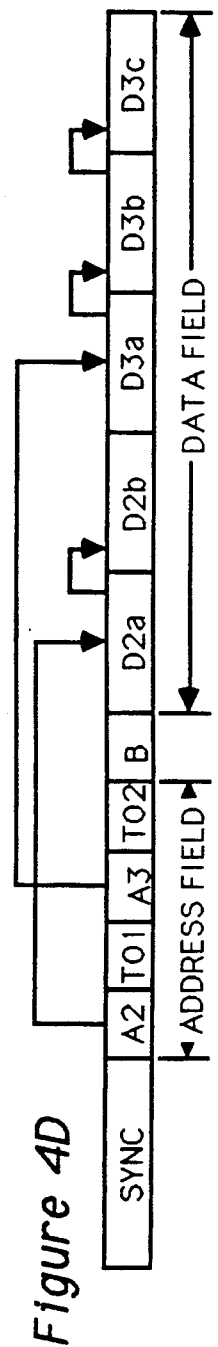
Figure 4A
Figure 4B
Figure 4C
Figure 4D

METHOD OF SUPER BATTERY SAVING IN A SELECTIVE CALL RECEIVER

BACKGROUND OF THE INVENTION

This invention relates generally to the area of a signalling protocol received by a portable selective call receiver, such as a paging receiver, and a method of receiving the signal.

Paging protocols have been designed to communicate messages to a number of pagers. A message consists of an address signal if the message is a tone only message, or an address signal and an information signal if the message is a data message. Typically, a multiplicity of messages are accumulated prior to transmitting a selective call signal having the multiplicity of messages. Certain advantages exist in grouping the address signals of the multiplicity of messages into an address field and grouping the information signals of the multiplicity of messages into a data field transmitted subsequent to the address field.

Such a selective call signal is shown in U.S. Pat. No. 4,668,949, issued May 26, 1987, to Akahori et al. entitled "Pager Receiver Comprising a Message Detector Energized Only at Pertinent Time Slots". In this patent, the first data packet in the data field was associated with the first address slot in the address field, and subsequent data packets were associated with subsequent address slots.

Although this patent discloses some advantages of separate address and data fields, the invention has several disadvantages when adapted for use with conventional paging messaging applications. First, no provision is made for efficient tone only messaging. A tone only message would result in an unused data packet in the data field. Additionally, no provision is made for a variable number of address slots. The address field contains exactly eight address slots for address signals, no more or no less slots, each address slot having exactly one data packet associated therewith. Furthermore, no provision is made for data messages larger than the predetermined amount of information within a single packet. Thus, data messages are restricted to be smaller than a predetermined size. It is desirable to provide a remedy for these disadvantages while providing for separate address and data fields in a selective call signalling protocol.

Furthermore, the prior art provided for only a single class of battery saving pagers. No provision was made for pagers which may require a high performance battery saving algorithm.

SUMMARY OF THE INVENTION

It is therefore an object of this invention to provide a paging system which resolves the aforementioned problems.

It is another object of this invention to provide a paging receiver capable of receiving a signal which resolves the aforementioned problems while implementing improved battery saving methods.

It is yet another object of this invention to provide a paging terminal capable of generating a signal which resolves the aforementioned problems.

In accordance with the objects of the present invention, there is provided in one form a method in a selective call receiver of receiving a message having an address, the message received from within a message signal including an address field having a plurality of address signals therein. The selective call receiver comprises a receiving means capable of operating in a first normal operating mode and a second power conserving mode. The method comprises the steps of operating the receiving means in the first normal operating mode in order to receive the message, and switching the receiving means to operate in the second power conserving mode if the absence of an address signal matching a predetermined address signal is found in a predetermined number of address signals, wherein the predetermined number is less than the number of address signals within the address field. contains the selective signal, said method comprising the steps of:

receiving an address signal matching a predetermined address;

receiving a first packet having a position related to the position of the address signal;

receiving a second packet following the first packet in response to a continuation signal included within the first packet; and combining the information from the received packets in order to recover the message.

In accordance with the present invention, a method of receiving a message from within a message signal including an address field having a plurality of address signals therein, the message signal further including a data field following the address field and having a plurality of packets therein, the message signal further includes a boundary signal indicating the boundary between the address field and the data field thereby providing for an address field having a variable number of address signals, said method comprising the steps of:

activating a receiving means in order to receive the message;

receiving the boundary signal; and deactivating the receiving means at the end of the address field in response to the absence of an address signal matching a predetermined address signal within the address field.

BRIEF SUMMARY OF THE DRAWINGS

FIG. 4 shows a structure of a selective call signaling protocol received by a pager operating in accordance with the present invention.

FIG. 4B shows an alternate structure of a selective call signaling protocol received by a pager operating in accordance with the present invention.

FIG. 4C shows an alternate structure of a selective call signaling protocol received by a pager operating in accordance with the present invention.

FIG. 4D shows an alternate structure of a selective call signaling protocol received by a paging receiver operating in accordance with the present invention.

DESCRIPTION OF A PREFERRED EMBODIMENT

Figure 1:
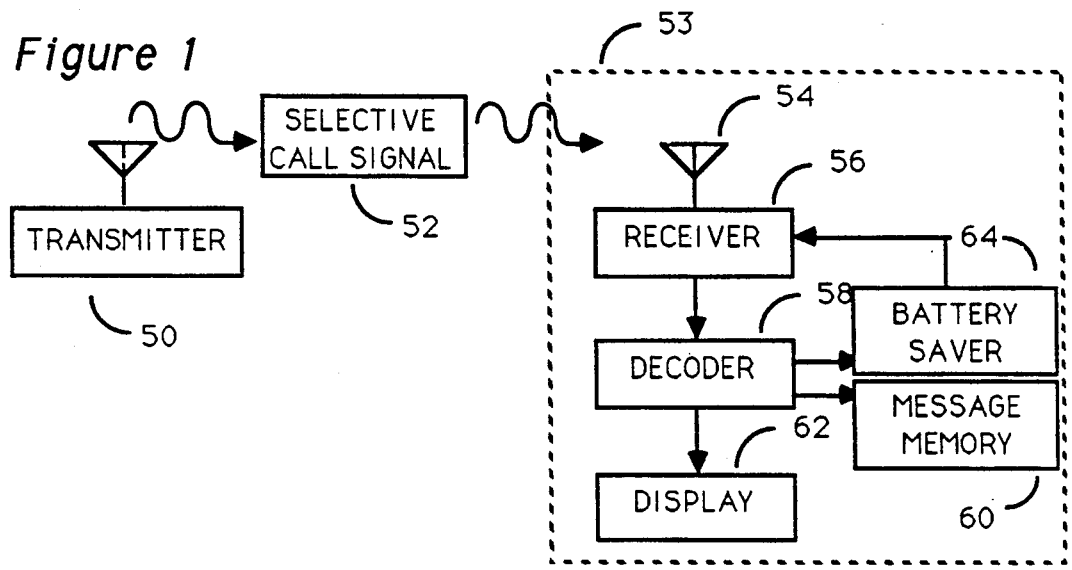
FIG. 1 shows a paging system operating in accordance with the present invention.

FIG. 1 shows a paging system operating in accordance with the present invention. Messages are accumulated by base station transmitter 50 which groups the messages into corresponding address and information fields. The transmitter may include a "Modax 500" paging terminal manufactured by Motorola Inc. which has been adapted for this function. The selective call signal 52 is RF modulated and transmitted to at least one paging receiver 53. The RF modulated selective call signal is received on antenna 54, demodulated by receiving means 56 and processed by decoder 58. Upon receiving a data message having an address matching a predetermined address assigned to the paging receiver, the message may be stored in message memory 60. The message may be alerted and displayed on display means 62. In the process of searching for the message, decoder 58 may periodically activate and deactivate receiving means 56 through battery saver 64. Decoder 58 is preferably a microcomputer based decoder. A preferred microcomputer is the Motorola MC146805H2. U.S. Pat. No. 4,755,816 to DeLuca and assigned to the assignee of the present invention shows a microcomputer controlled pager, U.S. Pat. No. 4,860,003 to DeLuca et al. and assigned to the assignee of the present invention shows a paging receiver which conserves power during the reception of a paging signal. These patents, when combined with the description herein, provide an enabling description of the invention; said patents are hereby incorporated by reference.

Figure 2:
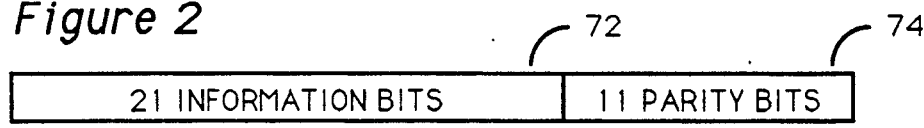
FIG. 2 shows the structure of a codeword in accordance with the present invention.

FIG. 2 shows the structure of a codeword in accordance with the present invention. The codeword is a 31,21 BCH extended codeword which contains twenty one information bits 72 and eleven parity bits 74. Ten of the parity bits are generated in response to the information bits in a manner which provides for error correction and detection using a well-known BCH algorithm. The eleventh parity bit provides overall even parity to the thirty-one bits. It should be appreciated that in an alternate embodiment, a different codeword structure may be used.

An address consists of one codeword shown by FIG. 2 which has twenty-one information bits. Thus, the selective call signaling protocol provides $2^{21}$ addresses for assignment to selective call receivers. A data packet consists of two codewords. Thus, a data packet has 42 information bits for communicating message information.

Figure 3:
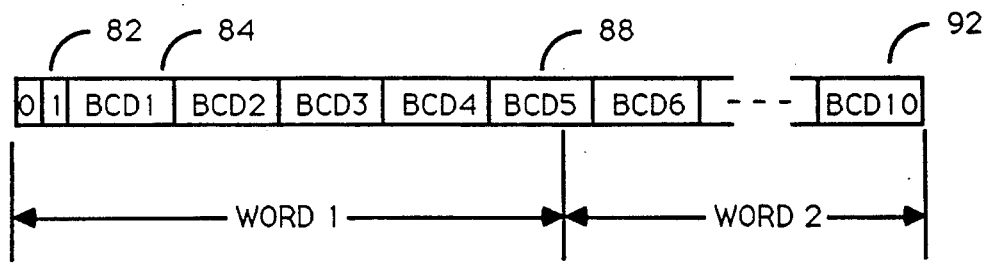
FIG. 3 shows the structure of a data packet.

FIG. 3 shows the structure of a data packet. The data packet may begin with a format signal. The format signal is comprised within the first two bits of the data packet. In one embodiment, the format signal indicates the structure of the data within the data packet or that the message information is continued within the following data packet. A "00" in the format signal indicates that no additional information associated with the message follows, while a "01" comprises a continuation signal which indicates that the following packet contains additional information associated with the message. The remaining forty information bits constitute ten binary coded decimal (BCD) characters. The first codeword contains BCD character 1, 84, through three bits of BCD character 5, 88. The second word contains the remainder of BCD character 5 through BCD character 10, 92. Alternate embodiments may vary the predetermined number of words within the information packet, or may eliminate the continuation signal from the format signal, or may further eliminate the format signal altogether.

FIG. 4A shows a structure of a selective call signaling protocol received by a pager operating in accordance with the present invention. The protocol begins with a synchronization signal which provides bit and frame synchronization for paging receivers. The address field has a predetermined number of address slots, and the data field has a corresponding number of information packets. This embodiment shows six slots in the address field and six corresponding data packets in the data field; alternate embodiments may use more or less slots and data packets.

The first data message has an address A1 which is in the first slot in the address field. The first data packet in the data field has message information associated with address A1 and is shown as D1. If a pager receives the signal of FIG. 4A and finds its own address, A1, in the first address slot, it receives its associated message information only in the first data packet D1 in the data field.

The second message has more information than the first message, and the information is contained within the second and third packets within the data field and is shown as D2a and D2b. Therefore, this message contains between eleven and twenty BCD characters. Since the message information is contained within the second and third packets within the data field, the corresponding slots within the address field are filled with the address associated with the message. This is shown by A2 occurring in the second and third slots within the address field. If a pager receiving the signal of FIG. 4A finds its own address, A2, in the second and third address slots, it receives its associated message information only in the second and third data packets in the data field.

The third message has more information than the second message, and the information is contained within the fourth, fifth, and sixth packets within the data field and is shown as D3a, D3b, and D3c. Therefore, this message contains between twenty-one and thirty BCD characters. Since the message information is contained within the fourth through sixth packets within the data field, the corresponding slots within the address field are filled with the address associated with the message. This is shown by A3 occurring in the fourth, fifth, and sixth slots within the address field. If a pager receiving the signal of FIG. 4A finds its own address, A3, in the fourth, fifth, and sixth address slots, it receives its associated message information only in the fourth, fifth, and sixth data packets in the data field.

Thus, FIG. 4A shows a paging signal wherein a message may be contained within a variable number of data packets. Since every data packet has an associated address slot, each address slot associated with multi-packet messages are filled with the address corresponding to the message. The signal of FIG. 4A has a predetermined number of data packets, each data packet having a corresponding address slot and a predetermined number of address slots.

FIG. 4B shows an alternate structure of a selective call signaling protocol received by a pager operating in accordance with the present invention. In this figure, the first, second, and third data messages of FIG. 4A are present. Additionally, the address and data field have a predetermined number of slots and data packets respectively. However, the second and third multi-packet messages have only single addresses in the address field. In contrast to the embodiment of FIG. 4A, in this embodiment, the continuation signal 82 of FIG. 3 is used to indicate a multi-packet message.

Thus, the first message has an address in the first data slot A1 and message information in the first data packet D1. Since it is a single packet message, the continuation signal in data packet D1 is absent. The second message has an address in the second slot A2 and message information beginning in the second data packet D2a. Since it is a two-packet message, the continuation signal in data packet D2a is present indicating that information continues in the next data packet D2b. Since the message information does not continue beyond the data packet D2b, the continuation signal is absent in data packet D2b. Similarly, the third message has an address in the fourth address slot A3 and message information beginning in the fourth data packet D3a. Since it is a three-packet message, the continuation signal in data packets D3a and D3b is present indicating that information is contained within D3a, D3b and D3c. Since the message information does not continue beyond the data packet D3c, the continuation signal is absent from data packet D3c.

Use of the continuation signal within the data packets of FIG. 4B allows a multi-packet message to have only a single address within the address field. Since the beginning position of the message in the data field is inherently referenced to the position of the address in the address field, multi-packet messages leave vacant slots in the address field. These slots may be filled with tone only messages as shown by TO1, TO2, and TO3 of FIG. 4B which are in address slots left vacant by data packets D2b, D3b, and D3c, respectively. Thus, the continuation signal allows efficient use of tone only messaging and multi-packet messages. As in FIG. 4A, the message signal of FIG. 4B has a predetermined number of data packets and address slots, each data packet having a corresponding address slot.

FIG. 4C shows an alternate structure of a selective call signaling protocol received by a pager operating in accordance with the present invention. The signal of FIG. 4C uses the continuation signal in the data packet as in FIG. 4B and has address slots filled by TO1, TO2, and TO3 left vacant by D2b, D3b, and D3c, respectively. However, this embodiment has a variable boundary between the address and data fields.

The first word has a boundary signal B which indicates how many codewords are in the address field. The codeword shown by FIG. 2 may be used for the boundary signal wherein a predetermined number of information bits within the codeword indicate the number of codewords within the address field. In the example of FIG. 4C, the boundary signal would have a value of seven indicating that the address field contained seven codewords. In this example, the boundary signal could be contained within four of the twenty-one bits of the first codeword, thereby providing for up to sixteen codewords in the address field. The remaining information bits in the first codeword may be reserved for future use.

A paging receiver operating in accordance with this embodiment would receive and decode the boundary signal after the sync code and determine the number of words within the address field. The pager would then search the address slots within the address field for an address signal matching a predetermined address assigned to the pager. Upon finding an address corresponding to a data message, the position of the associated data packet in the data field is inherently communicated to the pager by the position of the address within the address field.

The message having an address of A2 is the first address in the address field and thus has message information in the first data packet within the data field D2a. A continuation signal indicates the message continues in the next data packet D2b. This leaves the second address slot vacant which is filled with a tone only address TO1. The next data message has an address A3 which is in the third slot within the address field, thus the message information begins in the third data packet D3a within the data field. Continuation signals indicate that the message continues in data packets D3b and D3c. Corresponding address slots are filled with tone only messages TO2 and TO3. Furthermore, additional tone only messages TO4 and TO5 are contained within the last two slots within the address field. These tone only addresses have no corresponding data packets since data packets are not required for tone only messages. After completion of the variable length address field, pagers not requiring information from the data field may conserve power until the next expected occurrence of the sync signal.

Thus, the protocol of FIG. 4C has the advantage of varying the size of the address field with a boundary signal. This provides for still further flexibility in that the tone only messages do not require slots to be left vacant by multi-packet data messages. Furthermore, since in the example one data packet has two codewords which correspond to two address slots, the boundary between the address field and the data field may be shifted in order to provide for efficient handling of the tone only and data messages communicated by the signaling protocol.

FIG. 4D shows an alternate structure of a selective call signaling protocol received by a paging receiver operating in accordance with the present invention. The signal of FIG. 4D uses the continuation signal in the data packet as in FIG. 4B and has address slots filled by TO1, and TO2 left vacant by D2b, D3b, and D3c, respectively. However, this embodiment has a variable boundary between the address and data fields wherein the boundary is indicated by a predetermined signal B between the address field and data field. In this embodiment, a pager receiving the address field would continue receiving until the boundary signal was encountered. The data field begins immediately after the boundary signal and data packets would be inherently related to address position within the address field as previously described. Furthermore, FIG. 4D shows that the continuation signal provides data packets without associated address slots, thereby providing for long data messages.

FIGS. 4C and 4D provide for variable length address and data fields. Furthermore, although FIG. 4C shows the total length of the address and data fields to be equivalent to that of FIGS. 4A and 4B, it should be appreciated that the total length of the address field and data field may be varied to accommodate messages communicated by the signaling protocol. Additionally, in an alternate embodiment, a subsequent data field may be included with still further message information for even longer messages, thus eliminating the vacating of address slots in the address field by very long messages. In such an embodiment, the data packet could include a vector signal indicating the occurrence of the message information in the subsequent data field. In an embodiment where the sync signals occur at a predetermined period, the sum total of the boundary signal, the address field, the data field and optionally the subsequent data field may be varied in order to fill the time between sync signals with message information.

Figure 5:
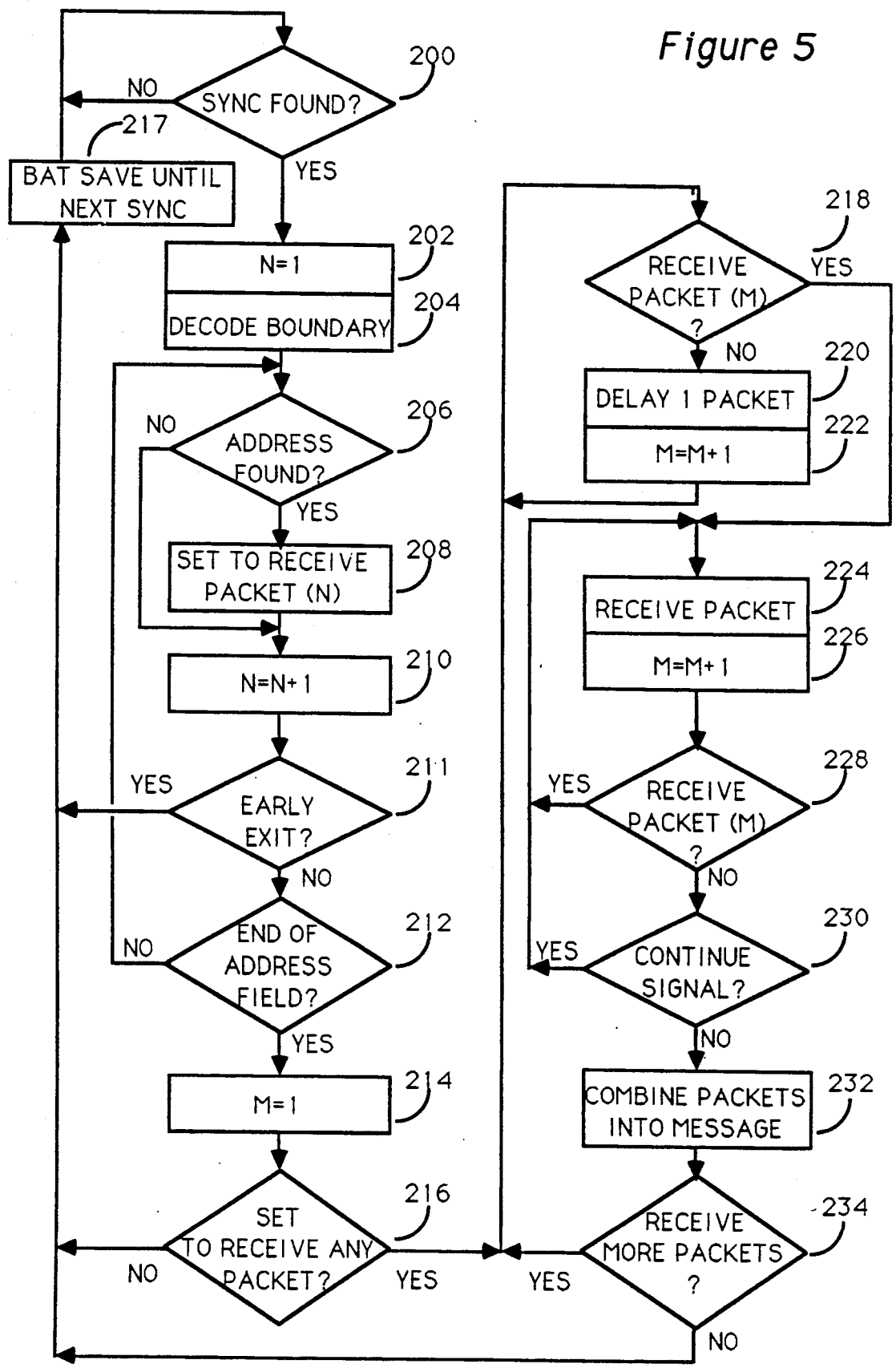
FIG. 5 shows a flowchart of a selective call receiver operating in accordance with the present invention.

FIG. 5 shows a flowchart of a selective call receiver operating in accordance with the present invention.

The execution of some of the steps of FIG. 5 is optional depending upon the signal to be received by the selective call receiver. The flowchart is realized within a program executed within a microcomputer within decoder 58 of FIG. 1.

In step 200, the synchronization signal is searched for in a manner known in the art. If sync is found, step 202 initializes a variable N, to equal 1, N being indicative of the position of the address slot within the address field. Then, if a signal corresponding to FIG. 4C is to be received, step 204 is optionally executed wherein the boundary signal is decoded. Next, in step 206, an address matching a predetermined address assigned to the paging receiver is searched for in a codeword within an address slot. If the address is found, step 208 is optionally executed and the paging receiver set to receive a data message. Note that step 208 is executed only in the case of the data message and is not executed if the message is a tone only message. In step 208, the paging receiver is set to receive information in a data packet corresponding to the variable N. From step 206, the variable N is incremented in step 210, thereby indicating the position of the next slot in the address field.

A certain class of pagers, super saver pagers, may require substantially improved battery savings. These pagers are provided for by the optional execution of step 211. An address field may have either a fixed or variable number of address slots, but super saver pagers search for their address only in a predetermined number of slots. For example, a super saver pager receiving signal shown by FIGS. 4A, 4B, 4C, or 4D would search only the first two address slots for its own address and then conserve power until the next sync code if the address was not found, while other pagers would search the entire address field for their address. Thus, the paging transmitter must place an address belonging to a super saver pager in one of the first two slots of the address field. The predetermined number (two in the example) of slots within which the super saver pager operates may vary from pager to pager and may be specified by a pager code plug option. If the super saver pager receives an address corresponding to a data message, step 208 further removes the super saver pager from the super saver mode and step 211 is not executed. Likewise, if a pager is not a super saver pager, step 211 is not executed. If in step 211 it is not time for a super saver pager to exit before the completion of the address field, the program proceeds to step 212.

In step 212, the end of the address field is checked. In embodiments of FIGS. 4A and 4B, this step would check for N being greater than a predetermined value of six. In the embodiment of FIG. 4C, this step would check for N to be greater than the boundary signal decoded in step 204. While in the embodiment of FIG. 4D, this step would check for the predetermined boundary signal to be found in the codeword examined in step 206. If the end of the address field is not detected by step 212, the program returns to step 206 to examine the next slot in the address field.

After the end of the address field is detected, the step 214 initializes a variable M to one, M being indicative of the position of the data packet within the data field. Then step 216 checks if step 208 set the paging receiver to receive any data packets. If no data packets are to be received, the program proceeds to step 217 to battery save until the next expected occurrence of a sync signal. Similarly, if in step 211 it is time for a super saver pager to exit early, the program proceeds to step 217.

If step 216 determines that packets are to be received in the data field, step 218 checks if the packet corresponding to M is to be received; if not, step 220 delays one packet. Battery saving may be performed during step 220. After delaying one packet, step 222 increments the variable M thereby maintaining the correspondence between the variable M and the position of the data packet. The program returns to step 218 and the cycle repeats until the data packet position occurs.

When the data packet position occurs, the program proceeds from step 218 to step 224 in response to which battery saving would be terminated. Step 224 receives the data packet containing message information. Then step 226 increments the variable M to correspond to the position of the next data packet. Step 228 is optionally executed and checks if a subsequent data packet was set to be received in step 208. If so, the program returns to step 224 to receive the next data packet. Step 208 is used by a paging receiver set to receive the signal of FIG. 4A, where a multi-packet message has a plurality of identical addresses in the data field. Step 230 is optionally executed to check if the data packet contained a continue signal as shown by the signals of FIGS. 4B, 4C, and 4D. If so, the program returns to step 224 to receive message information in the next data packet. After all of the data packets associated with the data message are received, step 232 combines the message information within the data packets to form a single message. The program then proceeds to step 234 to check if any more messages are to be received in the data field. A positive answer here corresponds to a pager receiving a plurality of messages within the data field. If true, the program returns to step 218 to continue the receiving process. If false, the program proceeds to step 217 to battery save until the next sync signal.

It will be appreciated that the invention has been described above by way of example and that modifications to the above may be made without departing from the spirit and scope of the invention.

What is claimed is:

1. In a selective call receiver having a predetermined address, a method of receiving a message from within a message signal including an address field having a multiplicity of address signals therein, the message signal further including a data field following the address field and having a multiplicity of packets therein, the position of each packet being related to the position of a corresponding address signal, each packet capable of containing a predetermined amount of information, wherein the message is included within a plurality of packets, and each of the corresponding plurality of address signals are identical address signals corresponding to said predetermined address, said method comprising the steps of:

activating a receiving means in order to receive at least a portion of the multiplicity of address signals in the address field;

deactivating the receiving means if the absence of an address signal corresponding to the predetermined address is found within a predetermined number of address signals, wherein the predetermined number is less than the number of address signals within the address field;

receiving a plurality of address signals corresponding to the predetermined address if the presence of an address signal corresponding to the predetermined address is found within the predetermined number of address signals;

receiving a plurality of packets from the data field each having a position related to the position of one of the plurality of address signals corresponding to the predetermined address;

combining the information contained in the received plurality of packets to form the message, the plurality of packets reconstructed in a predetermined manner to recover the message; and deactivating the receiving means.

2. In a selective call system comprising a transmitter and a plurality of selective call receivers, each of said plurality of selective call receivers being of a first selective call receiver type or a second selective call receiver type, a method of receiving a message from within a message signal including an address field having a multiplicity of address signals therein, the message signal further including a data field following the address field and having a multiplicity of packets therein, the position of each packet being related to the position of a corresponding address signal, each packet capable of containing a predetermined amount of information, wherein the message for the first selective call receiver type is included within a plurality of packets and a corresponding address signal and the message for the second selective call receiver type is included only within one of said multiplicity of address signals, said method comprising the steps of:

receiving an address signal matching a predetermined address;

receiving a first packet having a position related to the position of the address signal;

receiving at least a second packet following the first packet in response to a continuation signal included within the first packet, each of the at least second packet having a position related to the position of an address signal comprising a message for a selective call receiver of the second selective call receiver type; and combining the information contained in the first and the at least second packets to form a single message, the single message comprising at least one of the plurality of packets which are reconstructed in a predetermined fashion to recover the message.

3. In a selective call receiver, a method of receiving a message from within a message signal including an address field having a start and an end and comprising a plurality of address signals, the message signal further including a data field following the address field and having a plurality of packets therein, each of the packets having a start and an end, the message signal further includes a boundary signal indicating a boundary between the address field and the data field, thereby providing for an address field having a variable number of address signals, said method comprising the steps of:

(a) activating a receiving means at the start of the address field in order to receive the message;

(b) receiving the boundary signal;

(c) determining the end of the address field in response to the boundary signal; and (d) deactivating the receiving means at the end of the address field in response to an absence of an address signal within the address field matching a predetermined address signal corresponding to the selective call receiver; and (e) deactivating the receiving means in response to the boundary signal and an address signal within the address field matching a predetermined address signal, and thereafter activating the receiving means at the start of a packet having a position related to the position of the address signal, the position determined in response to the address signal and the boundary signal.

4. The method of claim 3 wherein the step (d) of deactivating comprises the steps of:

(f) deactivating the receiving means after a predetermined number of address signals are received if the absence of an address signal matching the predetermined address signal is found within the predetermined number of address signals and the predetermined number is less than the variable number of address signals within the address field; and (g) deactivating the receiving means at the end of the address field in response to an absence of an address signal within the address field matching a predetermined address signal corresponding to the selective call receiver and the predetermined number is greater than the variable number of address signals within the address field.

5. The method of claim 3 wherein the position of each packet is related to the position of a corresponding address signal, each packet capable of containing a predetermined amount of information, and the boundary signal has a position prior to the address field and contains a value indicative of the beginning of the data packet, thereby relating a data packet to a corresponding address signal.

6. The method of claim 3 wherein the position of each packet is related to the position of a corresponding address signal, each packet capable of containing a predetermined amount of information, and the boundary signal consists of a predetermined signal interposed between the address field and the data field, thereby relating a data packet to a corresponding address signal.

7. The method of claim 3 further comprising, after the step (e) of deactivating and thereafter activating the receiving means, the steps of:

(h) determining whether the received packet includes a continuation signal;

(i) deactivating the receiving means at the end of the received packet if the received packet does not include the continuation signal; and (j) receiving at least a next occurring packet if the received packet includes the continuation signal.

8. The method of claim 7 wherein the step (j) of receiving at least the next occurring packet comprises the step of receiving at least the next occurring packet if the packet includes the continuation signal, the at least next occurring packet having a position related to the position of an address signal comprising a tone only message.

9. In a selective call receiver comprising a receiving means capable of operating in a first normal operating mode and a second power conserving mode, a method of receiving a message having an address, the message received from within a message signal including an address field having a plurality of address signals therein said method comprising the steps of:

operating the receiving means in said first normal operating mode in order to receive the message; and switching the receiving means to operate in said second power conserving mode if the absence of an address signal matching a predetermined address signal is found within a predetermined number of address signals, wherein the predetermined number is less than the number of address signals within the address field.

10. The method of claim 9 wherein the message signal further includes a data field following the address field, the data field having a plurality of packets therein, the message signal further includes a boundary signal indicating the boundary between the address field and the data field thereby providing for an address field having a variable number of address signals, said method further comprising the steps of:

receiving an address signal matching the predetermined address within the predetermined number of address signals;

receiving the boundary signal;

determining the relationship between a packet and a corresponding address signal in response to the boundary signal; and receiving a packet having a position related to the position of the address signal.

11. The method of claim 10 wherein the position of each packet is related to the position of a corresponding address signal, each packet capable of containing a predetermined amount of information, and the boundary signal has a position prior to the address field and contains a value indicative of the beginning of the data packet, thereby relating a data packet to a corresponding address signal.

12. The method of claim 10 wherein the position of each packet is related to the position of a corresponding address signal, each packet capable of containing a predetermined amount of information, and the boundary signal consists of a predetermined signal interposed between the address field and the data field, thereby relating a data packet to a corresponding address signal.

* * * * *